United States Patent Office 3,576,000
Patented Apr. 20, 1971

3,576,000
AMINOETHER DERIVATIVES OF 9,10-DIHYDRO-9,10-ETHANO-9-ANTHROLS AND THEIR SALTS
Jacques Robert Boissier, Paris, and Roger Ratouis, Saint Cloud, France, assignors to Societe Industrielle pour la Fabrication des Antibiotiques (S.I.F.A.), Puteaux, France
No Drawing. Filed July 3, 1967, Ser. No. 650,636
Claims priority, application France, July 6, 1966, 68,353; Sept. 23, 1966, 77,375
The portion of the term of the patent subsequent to Jan. 14, 1986, has been disclaimed
Int. Cl. C07c 93/06
U.S. Cl. 260—326.5                6 Claims

ABSTRACT OF THE DISCLOSURE

Aminoether derivatives of 9,10-dihydro-9,10-ethano-9-anthrols and their acid addition and quaternary ammonium salts. These compounds are useful in therapeutics because of their antihistaminic and local anesthetic properties.

---

The compounds are new aminoether derivatives of 9,10-dihydro-9,10-ethano-9-anthrols and their acid addition and quaternary ammonium salts; they correspond to the formula:

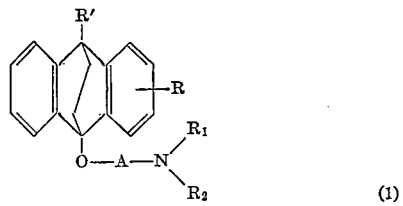

(1)

R–R': hydrogen, fluorine, chloroine or bromine atoms, lower alkyl or alkoxy or trifluoromethyl radicals (at least one of the substituents R or R' not being a hydrogen atom).
A: an alkylene radical containing from 2 to 6 carbon atoms.
$R_1$–$R_2$: hydrogen atoms or lower alkyl or hydroxalkyl radicals, or form with the nitrogen atom N a heterocyclic radical eventually substituted by one or several lower alkyl or hydroxyalkyl radicals.

They are very useful substances for human therapeutics, especially because of their remarkable antihistaminic and local anesthetic properties.

The compounds of Formula 1 are prepared by reacting a compound of formula:

(2)

(X: halogen, benzene-sulfonyl, toluene-sulfonyl or methane-sulfonyl radical)

with a substituted anthrol of formula:

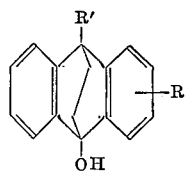

and with an alkaline agent.

This invention relates to new aminoether derivatives of 9,10-dihydro-9,10-ethano-9-anthrols and to their acid addition and quaternary ammonium salts. The invention also relates to the process for the preparation of these new products.

The products according to the invention have proved to be particularly useful in human therapeutics, especially as antihistaminic and local anesthetic medicaments.

The new aminoether derivatives of 9,10-dihydro-4,10-ethano-9-anthrols according to the invention correspond to the general formula:

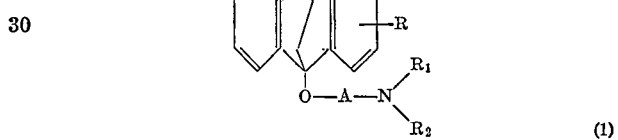

(1)

in which R and R', which may be identical or different, represent hydrogen, fluorine, chlorine or bromine atoms or lower alkyl, lower alkoxy or trifluoromethyl radicals, at least one of the substituents R or R' not being a hydrogen atom, A represents a straight or branched alkylene radical containing from 2 to 6 carbon atoms and $R_1$ and $R_2$, which may be identical or different, represent hydrogen atoms or lower alkyl or lower hydroxyalkyl radicals, or form with the nitrogen atom N a heterocyclic radical eventually substituted by one or several lower alkyl or hydroxyalkyl radicals.

Lower alkyl, lower alkoxy or lower hydroxyalkyl radicals mean containing from 1 to 5 carbon atoms.

Among the above indicated heterocyclic radicals, piperidinyl, pyrrolidinyl, morpholinyl and piperazinyl radicals can, for instance, be cited.

According to the invention, the aminoethers of general Formula 1 can be prepared by reacting a compound of general formula

(2)

in which X represents a halogen atom or a benzene-sulfonyl, toluene-sulfonyl or methane-sulfonyl radical, and A, $R_1$ and $R_2$ have the meaning above defined, with a substituted 9-10-dihydro-9,10-ethano-9-anthrol of general formula:

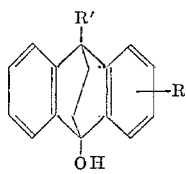

(3)

in which R and R' have the meaning above defined, and with an alkaline agent, and isolating, at the completion of the reaction, the product of Formula 1 thus obtained.

The process may advantageously be carried out by reacting, in the presence of the alkaline agent, a 9,10-dihydro-9,10-ethano-9-anthrol of Formula 3 with a great excess of the compound of formula:

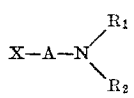

(2)

in comparison with the quantity stoichiometrically needful (e.g. twice this quantity). If a compound of Formula 2 wherein X is a halogen is employed, it is preferable to use, instead of the said compound, its salt formed from a hydracid; it is necessary, in that case, to increase the quantity of alkaline agent brought to the reaction medium.

In practice, the compound of Formula 2 is added, preferably in two times, into a mixture of alkaline agent and a 9,10-dihydro-9,10-ethano-9-anthrol of Formula 3 in an anhydrous solvent such as benzene or toluene. The alkaline agent which may be, for instance, anhydrous sodium or potassium hydroxide, is used in large excess, and the reaction is carried out with stirring and at the boiling temperature of the reaction medium.

When the reaction is over, the mineral compounds are separated by filtration, and the product of general Formula 1 is isolated by rectification of the filtrate or by any other conventional means.

The process, according to the invention, may likewise be carried out by using as alkaline agent a metal hydride (sodium hydride preferably); in this case, the metallic salt of 9,10-dihydro-9,10-ethano-9-anthrol of Formula 3 is first prepared by reacting this alcohol with an equimolecular amount of metal hydride. This reaction is performed in an anhydrous hydrocarbon such as, for instance, benzene, toluene, xylene, while operating advantageously under an inert dry gas, such as nitrogen and at the boiling temperature of the reaction medium. Then the metallic derivative obtained (its isolation is not necessary), is reacted with a compound of Formula 2 added to the reaction medium, while stirring, the temperature being the boiling temperature of the mixture. When the reaction is over, the mineral compounds are separated by filtration, and the product of general Formula 1 is isolated by rectification of the filtrate or by any other conventional means.

The aminoethers of general Formula 1 have a basic character and according to the invention their acid addition salts can be prepared by treating said aminoethers with the corresponding organic or inorganic acids, preferably in the presence of a solvent. Among these solvents, preferentially are used anhydrous solvents such as benzene, ethyl ether, ethanol and acetone. According to the invention, the quaternary ammonium salts can be prepared by treating the aminoethers of general Formula 1 with the corresponding quaternizing agents, in the presence of a solvent; among these solvents preference is given to anhydrous solvents such as ethyl ether, acetonitrile, acetone, dioxane, methanol, ethanol. The salts can eventually be prepared without isolating the aminoether of general Formula 1 from the reaction medium where it was obtained.

The new aminoethers of general Formula 1 and their salts constitute very useful substances for human therapeutics, especially because of their remarkable antihistaminic and local anesthetic properties.

Their toxicological and pharmacological investigations have shown their great activity and outstanding interest.

The results obtained in toxicological field (lethal doses 50), antihistaminic and local anesthetic activity studies have been summarized in the under-mentioned table where are shown:

(a) Lethal doses 50 determined in mice by intraperitoneal route.

(b) Average concentration (I.C. 50) required to produce a 50% inhibition on quinea-pig isolated ileum, according to Magnus' technique, and expressing the antagonistic action of the compounds against the contracturing action of histamine.

(c) The number of unitary lethal doses of histamine antagonized in quinea-pig by subcutaneous administration of 20 mg./kg. of the tested compound; the unitary lethal dose of histamine used in the experimentation was 0.8 mg. of histamine dihydrochloride administered by intravenous route, 30 minutes after the tested compound. The number of unitary lethal doses of histamine antagonized by a compound showed the extent of the antihistaminic activity in vivo.

(d) The sum of the numbers of stimulations showing the local anesthetic activity upon rabbit cornea according to Regnier's technique (Comptes Rendus de l'Académie des Sciences, Paris, 1923, 177, 558). A 1‰ solution of each tested compound was used. The said numbers were the numbers of stimulations necessary to induce the oculopalpebral reflex, 3 minutes, 6 minutes, 10 minutes, then every 5 minutes, after the instillation, the total experiment lasting one hour.

The products tested were in the form of hydrochlorides.

The table below shows:

(a) The especially remarkable antihistaminic activity of the 2 - chloro - 9 - (2 - dimethylaminoethoxy)-9,10-dihydro - 9,10 - ethanoanthracene hydrochloride, of the 4 - chloro - 9 - (2 - dimethylaminoethoxy) - 9,10-dihydro - 9,10 - ethanoanthracene hydrochloride and of the 3 - chloro - 9 - (2 - dimethylaminoethoxy) - 9,10 - dihydro - 9,10 - ethanoanthracene hydrochloride.

(b) The quite remarkable local anesthetic activity of the 1 - chloro - 9-(2-dimethylaminoethoxy)-9,10-hihydro-9,10 - ethanoanthracene hydrochloride and of the 2-methyl - 9 - [2 - (1 - pyrrolidinyl) - ethoxy]-9,10-dihydro - 9,10 - ethanoanthracene hydrochloride.

Because of their very interesting pharmacological properties, the new aminoethers of general Formula 1 and their acid addition and quaternary ammonium salts constitute very useful medicines for human therapeutics, especially as antihistaminics, antianaphylactics, antiemetics and local anesthetics. They can thereby, be employed in local or general treatment of allergy diseases (as for example allergic rhinitis, allergic asthma, gastritis, urticaria, contact dermatitis, eczema, erythema) and also, as local anesthetics in medicine, surgery and dentistry.

The usual dose varies, according to the product used, the patient treated, the complaint concerned, and the administration route selected; it may be, for example, in the treatment of allergic diseases from 2 mg. to 250 mg. per day by oral route in humans; when used in local anesthesia the preferential concentrations are between 0.5% and 10%. These data, of course, are not limiting data.

As medicines, the new aminoethers of general Formula 1, according to the invention, can be employed either in

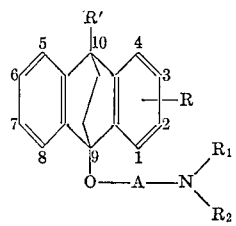

| Example Number | R | R' | —A— | —N(R₁)(R₂) | L-D. 50 i.p. mice, mg./kg. | I.C. 50 guinea-pig isolated ileum | Antihistaminic activity in vivo | Local anesthetic activity |
|---|---|---|---|---|---|---|---|---|
| 1 | CH₃—2 | H | —CH₂—CH₂— | —N(CH₃)(CH₃) | 168 | $5.10^{-8}$ | 600 | 128 |
| 2 | CH₃—2 | H | —CH₂—CH₂— | —N(pyrrolidine) | 130 | $2.10^{-8}$ | 600 | 615 |
| 3 | CH₃—2 | H | —CH₂—CH₂— | —N(CH₃)(CH₃) | 175 | $5.10^{-7}$ | 800 | 563 |
| 4 | Cl—2 | H | —CH₂—CH₂— | —N(CH₃)(CH₃) | 97 | $2.10^{-8}$ | 1,000 | 136 |
| 5 | Cl—4 | H | —CH₂—CH₂— | —N(CH₃)(CH₃) | 161 | $2.10^{-7}$ | 1,000 | 149 |
| 6 | Cl—1 | H | —CH₂—CH₂— | —N(CH₃)(CH₃) | 43.5 | $2.10^{-8}$ | 800–1,000 | 1,093 |
| 7 | Cl—3 | H | —CH₂—CH₂— | —N(CH₃)(CH₃) | 172 | $5.10^{-8}$ | 1,000 | 369 |
| 8 | Cl—3 | H | —CH₂—CH(CH₃)— | —N(CH₃)(CH₃) | 152 | $10^{-8}$ | 800 | 116 |
| 9 | H | CH₃— | —CH₂—CH₂— | —N(CH₃)(CH₃) | 209 | $10^{-8}$ | 600 | 537 | the form of bases or in the form of pharmaceutically acceptable acid addition or quaternary ammonium salts. Preference is given among the acid addition salts to those obtained with the following acids: hydrochloric, hydrobromic, hydriodic, nitric, sulfuric, phosphoric, acetic, maleic, fumaric, succinic, tartaric, citric, benzoic, alkane-sulfonics, as also to those obtained with xanthine derivatives containing an acid hydrogen and among the quaternary ammonium salts to those obtained with alkyl halides such as, for example, methyl chloride, methyl bromide, methyl iodide, hydroxyalkyl halides such as, for instance, 2-hydroxyethyl chloride, bromide or iodide, alkyl sulfates such as, for instance, dimethyl sulfate, alkyl-alkane-sulfonates or alkylarene sulfonates such as methylmethane sulfonate, methyl benzene sulfonate or methyl toluene sulfonate.

The present invention is also concerned with pharmaceutical compositions which comprise as active principles one at least of the compounds of the general Formula 1 and/or their acid addition salts and/or the quaternary ammonium salts. These compositions are prepared so that they can be administered through digestive, parenteral or local route. They can be solid or liquid, the pharmaceutical compositions are those usually employed in human medicine, as for example tablets, coated or not, capsules, solutions, syrups, suppositories, parenteral preparations, ointments, creams, aerosols; they are prepared according to usual means. The active principle or principles thereof are incorporated with excipients which are normally employed in those pharmaceutical compositions, such as, for example, talcum, gum arabic, lactose, starch, magnesium stearate, cocoa butter, aqueous or non-aqueous vehicles, animal or vegetable fatty substances, paraffin derivatives, glycols, various wetting, dispersing and emulsifying agents and preservatives.

The substituted 9,10 - dihydro - 9,10 - ethano-9-anthrols of general Formula 3 can be prepared according to the process described in the patent application filed in the United States of America by the applicant on May 17, 1967 we filed application for Letters Patent S.N. 639,012 for "New Substituted 9,10-Dihydro - 9,10 - Ethano-9-Anthrols and Process for Preparation."

The following non-limiting examples illustrate the invention.

EXAMPLE 1

9-(2-dimethylaminoethoxy)-2-methyl-9,10-dihydro-9,10-ethanoanthracene and hydrochloride (a) Preparation of the base.—A suspension of 23.6 g. (0.1 mole) of 2 - methyl - 9,10 - dihydro - 9,10-ethano- 9 - anthrol, of 14.4 g. (0.1 mole) of 2-dimethylamino chlorethane hydrochloride and of 16 g. (0.4 mole) of powdered sodium hydroxide in 200 ml. of benzene was boiled under reflux for 8 hours. After cooling the mixture to 40°–50° C. 14.4 g. (0.1 mole) of 2-dimethylamino chlorethane hydrochloride were again added, and reflux and stirring were continued for 15 hours longer. After cooling, the inorganic salts were filtered and washed with benzene. The benzenic solutions were collected and concentrated, the residue was distilled to yield 27.3 g. (89%) of 9 - (2 - dimethylaminoethoxy) - 2 - methyl - 9,10-dihydro - 9,10 - ethanoanthracene (oil boiling at 172°–176° C./0.2 mm. Hg and which gave by solidifying white crystals). Melting point of the crystals, after recrystallization from pentane: 53°–55° C. on a heating stage microscope.

Analysis.—Calculated for $C_{21}H_{25}NO$ (percent): C, 82.0; H, 8.2. Found (percent): C, 82.2; H, 8.3.

(b) Preparation of the hydrochloride.—A solution of 0.05 mole of hydrochloric acid in absolute ethanol was added to 15.35 g. (0.05 mole) of the above base in absolute ethanol. After cooling at 0° C., there were obtained 9 - (2 - dimethylaminoethoxy) - 2 - methyl - 9,10-dihydro-9,10 - ethanoanthracene hydrochloride as white crystals. Melting point after recrystallization from ethanol: 213°–214° C., on a heating stage microscope.

Analysis. Calculated for $C_{21}H_{26}ClNO$ (percent): C, 73.3; H, 7.6. Found (percent): C, 73.5; H, 7.6.

EXAMPLE 2

2-methyl-9-[2-(1-pyrrolidinyl)-ethoxy]-9,10-dihydro-9,10-ethanoanthracene and hydrochloride (a) Preparation of the base.—Using the process described in Example 1(a), but using twice 17 g. (0.1 mole) of 2-(1-pyrrolidinyl) chlorethane hydrochloride, there were obtained 27 g. (81%) of 2 - methyl-9-[2-(1-pyrrolidinyl) - ethoxy] - 9,10 - dihydro - 9,10 - ethanoanthracene (oil boiling at 194°–196° C./0.2 mm. Hg and giving by solidification white crystals). Melting point after recrystallization from pentane: 71° C., on a heating stage microscope.

Analysis.—Calculated for $C_{23}H_{27}NO$ (percent): C, 82.8; H, 8.2. Found (percent): C, 82.7; H, 8.1.

(b) Preparation of the hydrochloride.—Using the process described in Example 1(b), but starting from 16.65 g. (0.05 mole) of the above base, there were obtained 16.9 g. of 2-methyl-9-[2-(1-pyrrolidinyl)-ethoxy] - 9,10 - dihydro-9,10-ethanoanthracene hydrochloride as white crystals. Melting point after recrystallization from a mixture of ethanol and ether: 190°–191° C. on a heating stage microscope:

Analysis.—Calculated for $C_{23}H_{28}ClNO$ (percent): C, 74.7; H, 7.6. Found (percent): C, 74.6; H, 7.5.

EXAMPLE 3

9-(2-dimethylaminoethoxy)-2-methoxy-9,10-dihydro-9,10-ethanoanthracene and hydrochloride (a) Preparation of the base.—Using the process described in Example 1(a), but starting from 25.2 g. (0.1 mole) of 2-methoxy-9,10-dihydro-9,10-ethano-9-anthrol, there were obtained 26.4 g. (82%) of 9-(2-dimethylaminoethoxy)-2-methoxy-9,10-dihydro - 9,10 - ethanoanthracene (oil boiling at 190–192° C./0.2 mm. Hg).

(b) Preparation of the hydrochloride.—Using the process described in Example 1(b), but starting from 16.15 g. (0.05 mole) of the above base, there were obtained 15.2 g. of 9-(2-dimethylaminoethoxy)-9,10-dihydro-9,10-ethanoanthracene hydrochloride as white crystals. Melting point after recrystallization from isopropanol: 177°–178° C. on a heating stage microscope.

Analysis.—Calculated for $C_{21}H_{26}ClNO_2$ (percent): C, 70.1; H, 7.3. Found (percent): C, 70.1; H, 7.3.

EXAMPLE 4

2-chloro-9-(2-dimethylaminoethoxy)-9,10-dihydro-9,10-ethanoanthracene and hydrochloride (a) Preparation of the base.—Using the process described in Example 1(a), but starting from 25.7 g. (0.1 mole) of 2-chloro-9,10-dihydro-9,10-ethano-9-anthrol, the the concentration of the benzenic solutions resulting from the reaction yielded a solid residue which was recrystallized from petroleum ether (fraction boiling from 35° to 50° C.). There were obtained 23 g. (70%) of 2-chloro-9-(2-dimethylaminoethoxy)-9,10-dihydro - 9,10 - ethanoanthracene as cream-coloured crystals. Melting point: 92° C. on a heating stage microscope.

Analysis.—Calculated for $C_{20}H_{22}ClNO$ (percent): C, 73.3; H, 6.8. Found (percent): C, 73.4; H, 6.8.

(b) Preparation of the hydrochloride.—Using the process described in Example 1(b), but starting from 16.4 g. (0.05 mole) of the above base, there were obtained 13.8 g. of 2-chloro-9-(2-dimethylaminoethoxy)-9,10 - dihydro-9,10-ethanoanthracene hydrochloride as white crystals. Melting point after recrystallization from a mixture of acetone and isopropanol: 216°–220° C. on a heating stage microscope.

Analysis.—Calculated for $C_{20}H_{23}Cl_2NO$ (percent): C, 65.9; H, 6.4. Found (percent): C, 65.8; H, 6.3.

EXAMPLE 5

4-chloro-9-(2-dimethylaminoethoxy)-9,10-dihydro-9,10-ethanoanthracene and hydrochloride (a) Preparation of the base.—Using the process described in Example 1(a), but starting from 25.7 g. (0.1 mole) of 4-chloro-9,10-dihydro-9,10-ethano-9-anthrol, the concentration of the benzenic solutions resulting from the reaction yielded an oil which slowly solidified. The crystals thus obtained were recrystallized from pentane. There were obtained 18.4 g. (56%) of 4-chloro-9-(2-dimethylaminoethoxy)-9,10-dihydro - 9,10 - ethanoanthracene as cream coloured crystals. Melting point: 60° C. on a heating stage microscope.

Analysis.—Calculated for $C_{20}H_{22}ClNO$ (percent): C, 73.3; H, 6.8. Found (percent): C, 73.3; H, 6.8.

(b) Preparation of the hydrochloride.—Using the process decribed in Example 1(b), but starting from 16.4 g. (0.05 mole) of the above base, there were obtained 15 g. of 4-chloro-9-(2-dimethylaminoethoxy) - 9,10 - dihydro-9,10-ethanoanthracene hydrochloride as white crystals. Melting point after recrystallization from isopropanol: 218° C. on a heating stage microscope.

Analysis.—Calculated for $C_{20}H_{23}Cl_2NO$ (percent): C, 65.9; H, 6.4. Found (percent): C, 65.7; H, 6.3.

EXAMPLE 6

1-chloro-9-(2-dimethylaminoethoxy)-9,10-dihydro-9,10-ethanoanthracene and hydrochloride (a) Preparation of the base.—Under an atmosphere of nitrogen, a suspension of 25.7 g. (0.1 mole) of 1-chloro-9,10-dihydro-9,10-ethano-9-anthrol and of 5.3 g. (0.11 mole) of sodium hydride employed as a 50% suspension in mineral oil in 300 ml. of toluene was boiled to reflux for 5 hours with stirring. After cooling the mixture to 40°–50° C., 14 g. (0.13 mole) of 2-dimethylamino chlorethane freshly distilled were added, and the mixture was boiled under reflux for 15 hours. After cooling, the inorganic salts were filtered and washed with toluene. All the toluenic solutions were concentrated, and the residue was distilled. There were obtained 15.1 g. (46%) of 1-chloro-9-(2-dimethylaminoethoxy)-9,10 - dihydro - 9,10-ethanoanthracene as an oil boiling at 175°–180° C./0.2 mm. Hg and which gave white crystals by solidification. Melting point after recrystallization from pentane: 70°–74° C. on a heating stage microscope.

Analysis.—Calculated for.—$C_{20}H_{22}ClNO$ (percent): C, 73.3; H, 6.8. Found (percent): C, 73.3; H, 7.0.

(b) Preparation of the hydrochloride.—Using the process described in Example 1(b), but starting from 16.4 g. (0.05 mole) of the above base, there were obtained 11 g. of 1-chloro-9-(2-dimethylamioethoxy)-9,10-dihydro- 9,10-ethanoanthracene hydrochloride as white crystals. Melting point after recrystallization from a mixture of isopropanol and ether: 209°–211° C. on a heating stage microscope.

Analysis.—Calculated for $C_{20}H_{23}Cl_2NO$ (percent): C, 65.9; H, 6.4. Found (percent): C, 66.0; H, 6.5.

EXAMPLE 7

3-chloro-9-(2-dimethylaminoethoxy)-9,10-dihydro-9,10-ethanoanthracene and hydrochloride (a) Preparation of the base.—Using the process described in Example 6(a), but starting from 25.7 g. (0.1 mole) of 3-chloro-9,10-dihydro-9,10-ethano - 9 - anthrol, there were obtained 16.8 g. (51%) of 3-chloro-9-(2-dimethylaminoethoxy)-9,10-dihydro - 9,10 - ethanoanthracene as an oil boiling at 182°–186° C./0.2 mm. Hg.

(b) Preparation of the hydrochloride—Using the process described in Example 1(b), but starting from 16.4 g. (0.05 mole) of the above base, there were obtained 12 g. of 3 - chloro-9-(2-dimethylaminoethoxy)-9,10-dihydro-9,10-ethanoanthracene hydrochloride as white crystals. Melting point after recrystallization from a mixture of isopropanol and ether: 195°–196° C., on a heating stage microscope.

Analysis.—Calculated for $C_{21}H_{25}Cl_2NO$ (percent): C, 65.9; H, 6.4. Found (percent): C, 65.7; H, 6.7.

EXAMPLE 8

3-chloro-9-(2-dimethylaminopropoxy)-9,10-dihydro-9,10-ethanoanthracene and hydrochloride (a) Preparation of the base.—Using the process described in Example 6(a), but starting from 25.7 g. (0.1 mole) of 3-chloro-9,10-dihydro-9,10-ethano-9-anthrol and 15.9 g. (0.13 mole) of the freshly distilled base obtained from the 1-dimethylamino-2-chloro propane hydrochloride, there were obtained 25 g. (73%) of 3-chloro-9-(2-dimethylaminopropoxy)-9,10-dihydro-9,10 - ethanoanthracene as an oil boiling at 175°–186° C./0.2 mm. Hg.

(b) Preparation of the hydrochloride.—Using the process described in Example 1(b), but starting from 16.4 g. (0.05 mole) of the above base, there were obtained 9.8 g. of 3-chloro-9-(2-dimethylaminopropoxy)-9,10-dihydro-9,10-ethanoanthracene hydrochloride as white crystals. Melting point: 114°–116° C. on a heating stage microscope after recrystalliaztion from a mixture of isopropanol and ether.

Analysis.—Calculated for $C_{21}H_{25}Cl_2NO$ (percent): C, 66.7; H, 6.7. Found (percent): C, 66.7; H, 6.6.

EXAMPLE 9

9-(2-dimethylaminoethoxy)-10-methyl-9,10-dihydro-9,10-ethanoanthracene and hydrochloride (a) Preparation of the base.—Using the process described in Example 1(a), but starting from 23.6 g. (0.1 mole) of 10-methyl-9,10-dihydro-9,10-ethano-9-anthrol, there were obtained 27.6 g. (90%) of 9-(2-dimethylaminoethoxy)-10-methyl-9,10-dihydro - 9,10 - ethanoanthracene as an oil boiling at 182° C. under 0.5 mm. Hg.

(b) Preparation of the hydrochloride.—Using the process described in Example 1(b), but starting from 15.35 g. (0.05 mole) of the above base, there were obtained 15.4 g. of 9-(2-dimethylaminoethoxy)-10-methyl-9,10 - dihydro - 9,10 - ethanoanthracene hydrochloride as white crystals. Melting point after recrystallization from ethanol: 231°–233° C. on a heating stage microscope.

Analysis.—Calculated for $C_{21}H_{26}ClNO$ (percent): C, 73.3; H, 7.6. Found (percent): C, 73.5; H, 7.5.

EXAMPLE 10

Tablets were prepared which corresponded to the formula:

| | Mg. |
|---|---|
| 2-chloro-9-(2-dimethylaminoethoxy) - 9,10 - dihydro-9,10-ethanoanthracene hydrochloride | 25 |
| Excipient s.q. for a tablet | 200 |

Excipient can be: lactose, starch, talcum, magnesium stearate.

EXAMPLE 11

A syrup was prepared which corresponded to the formula:

2 - chloro - 9 - (2 - dimethylaminoethoxy) - 9,10 - dihydro-9-10-ethanoanthracene hydrochloride—100 mg.
Flavoured excipient s.q. for—100 ml.

EXAMPLE 12

Parenteral preparations were prepared which corresponded to the formula:

2 - chloro - 9 - (2 - dimethylaminoethoxy - 9,10 - dihydro-9,10-ethanoanthracene hydrochloride—25 mg.
Aqueous solution s.q. for—5 ml.

EXAMPLE 13

An ointment was prepared which corresponded to the formula:

| | G. |
|---|---|
| 2 - chloro - 9 - (2 - dimethylaminoethoxy) - 9,10-dihydro-9,10-ethanoanthracene hydrochloride | 2 |
| Emulsified excipient s.q. | 100 |

EXAMPLE 14

An ointment was prepared which corresponded to the formula:

| | G. |
|---|---|
| 2 - methyl - 9 - [2 - (1 - pyrrolidinyl) - ethoxy]-9,10-dihydro-9,10-ethanoanthracene hydrochloride | 2 |
| Emulsified excipient s.q. | 100 |

We claim:
1. A compound selected from the group consisting of aminoether derivatives of 9,10-dihydro-9,10-ethano-9-anthrols and their pharmaceutically acceptable acid addition and quaternary ammonium salts, said aminoether derivatives of 9,10-dihydro-9,10-ethano-9-anthrols having the formula:

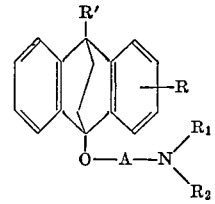

(1)

in which R and R' represent members selected from the group consisting of hydrogen, fluorine, chlorine and bromine atoms and lower alkyl, lower alkoxy and trifluoromethyl radicals, at least one of the substituents R and R' not being a hydrogen atom, A represents an alkylene radical containing from 2 to 6 carbon atoms and $R_1$ and $R_2$ are members selected from the group consisting of hydrogen atom, lower alkyl and lower hydroxyalkyl radicals and, when taken together with the nitrogen to which they are attached, piperidinyl, piperazinyl, pyrrolidinyl, morpholinyl, lower alkyl piperidinyl, lower alkyl piperazinyl, lower alkyl pyrrolidinyl, lower alkyl morpholinyl, lower hydroxyalkyl piperidinyl, lower hydroxyalkyl piperazinyl, lower hydroxyalkyl pyrrolidinyl and lower hydroxyalkyl morpholinyl radicals.

2. A compound selected from the group consisting of 2 - chloro - 9 - (2 - dimethylaminoethoxy) - 9,10 - dihydro-9,10-ethanoanthracene and pharmaceutically acceptable acid addition and quaternary ammonium salts thereof.

3. A compound selected from the group consisting of 4 - chloro - 9 - (2 - dimethylaminoethoxy) - 9,10 - dihydro-9,10-ethanoanthracene and pharmaceutically acceptable acid addition and quaternary ammonium salts thereof.

4. A compound selected from the group consisting of 1 - chloro - 9 - (2 - dimethylaminoethoxy) - 9,10 - dihydro-9,10-ethanoanthracene and pharmaceutically acceptable acid addition and quaternary ammonium salts thereof.

5. A compound selected from the group consisting of 3 - chloro - 9 - (2 - dimethylaminoethoxy) - 9,10 - dihydro-9,10-ethanoanthracene and pharmaceutically acceptable acid addition and quaternary ammonium salts thereof.

6. A compound selected from the group consisting of 2 - methyl - 9 - [2 - (1 - pyrrolidinyl) - ethoxy] - 9,10-dihydro-9,10-ethanoanthracene and pharmaceutically acceptable acid addition and quaternary ammonium salts thereof.

References Cited
UNITED STATES PATENTS

| | | | |
|---|---|---|---|
| 3,227,716 | 1/1966 | Harms | 260—570.7X |
| 3,422,106 | 1/1969 | Boissier et al. | 260—326.5X |

NICHOLAS S. RIZZO, Primary Examiner

J. A. NARCAVAGE, Assistant Examiner

U.S. Cl. X.R.

260—247.2, 247.7, 268, 294, 294.7, 326.3

UNITED STATES PATENT OFFICE
CERTIFICATE OF CORRECTION

Patent No. 3,576,000          Dated April 20, 1971

Inventor(s) Jacques Robert Boissier and Roger Ratouis

It is certified that error appears in the above-identified patent and that said Letters Patent are hereby corrected as shown below:

In the heading of the patent, "assignors to Societe Industrielle pour la Fabrication des Antibiotiques (S.I.F.A.), Puteaux, France"

should be --Roussel-UCLAF, Paris, France--.

Signed and sealed this 4th day of January 1972.

(SEAL)
Attest:

EDWARD M. FLETCHER, JR.　　　ROBERT GOTTSCHALK
Attesting Officer　　　　　　　　Acting Commissioner of Patents